March 1, 1960     D. E. PERRY     2,926,409
SNAP FRICTION LOCKING DEVICE
Filed Sept. 23, 1957     2 Sheets-Sheet 1
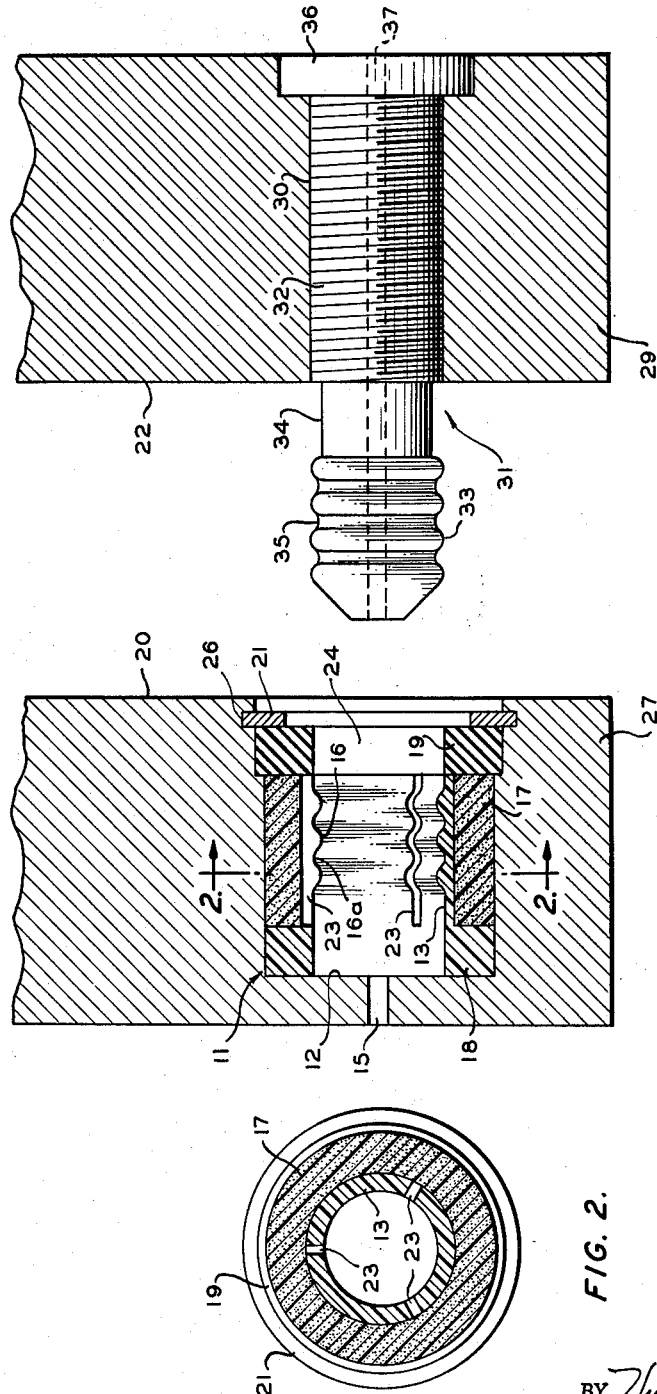
INVENTOR.
D. E. PERRY
BY *Hudson & Young*
ATTORNEYS March 1, 1960 D. E. PERRY 2,926,409
SNAP FRICTION LOCKING DEVICE
Filed Sept. 23, 1957 2 Sheets-Sheet 2
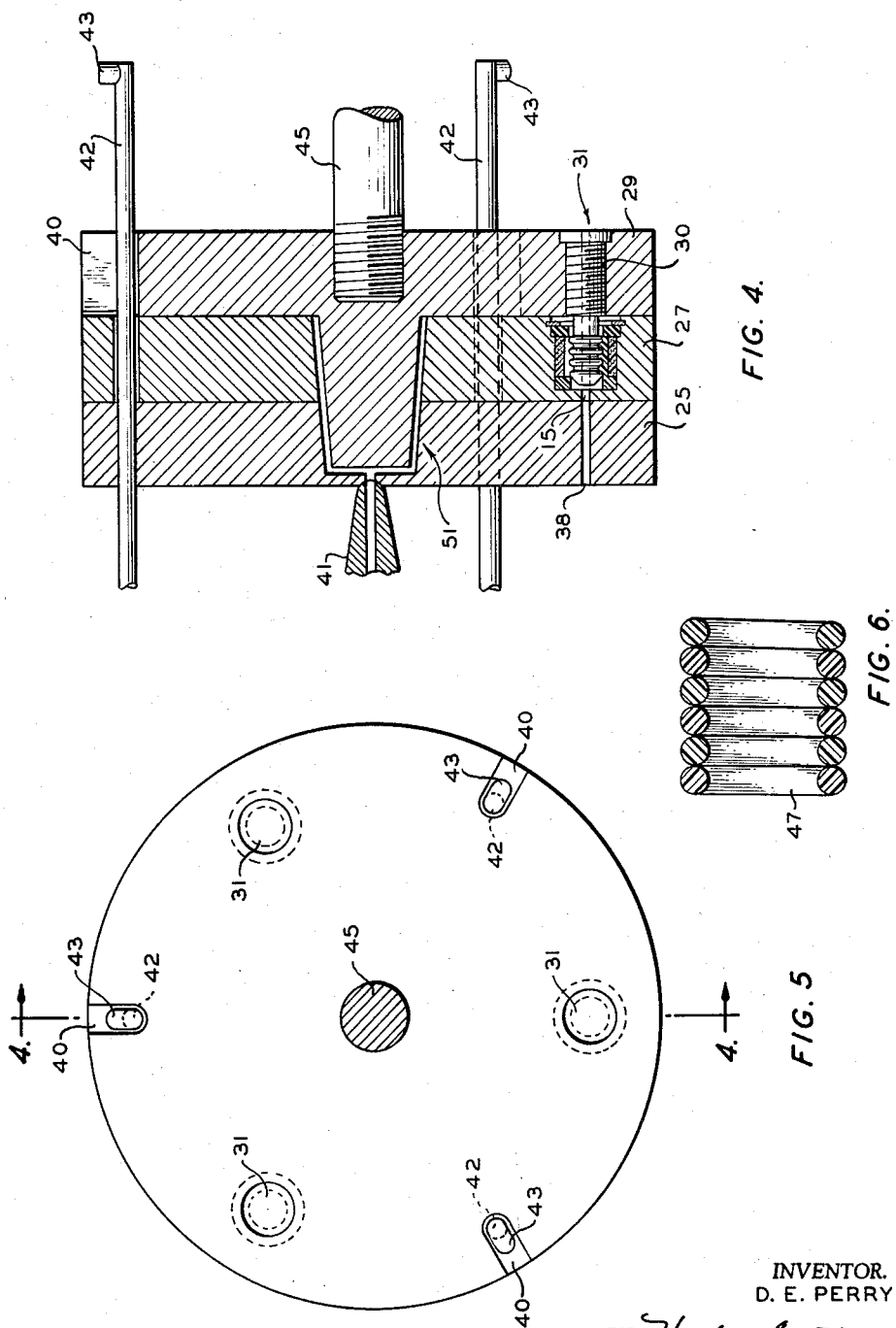
INVENTOR.
D. E. PERRY
BY Hudson & Young
ATTORNEYS.

United States Patent Office 2,926,409
Patented Mar. 1, 1960

2,926,409

SNAP FRICTION LOCKING DEVICE

Dan E. Perry, Bartlesville, Okla., assignor to Phillips Petroleum Company, a corporation of Delaware Application September 23, 1957, Serial No. 685,570

6 Claims. (Cl. 24—217)

This invention relates to a device for holding or locking two or more members tightly together. In one aspect it relates to a device for holding or locking two or more members tightly together yet allowing quick release. In another aspect it relates to a snap friction device for locking or holding die plates of injection molding machines tightly together during the injection molding operation, and subsequently allowing the plates to be separated upon exertion of the pulling force on one of the plates with respect to another plate.

An object of this invention is to provide a device for holding or locking two or more members together.

Another object of this invention is to provide a device for holding or locking a pair of members together yet allowing quick release of one member from the other.

Still another object of this invention is to provide such a device which is sufficiently strong to hold a pair of pressure injection die plates together while exerting a pull to break the sprue and yet providing quick release of one plate from the other.

Another object of this invention is to provide such a device which is simple and inexpensive to manufacture and to maintain.

Still other objects and advantages will be realized upon reading the following description which, taken with the attached drawing, forms a part of this specification.

Such prior art devices as latches and the like have been used in the injection molding industry to hold multiple die plates together during the injection molding step and particularly during breaking of the sprue. Such devices have not been wholly successful in providing means for holding die plates tightly together while breaking the sprue and yet allow quick and positive release for separation of the plates for removal of the molded article.

My device provides means for holding die plates tightly together while exerting sufficient pull on the plates remote from the injection plate for breaking the sprue and yet allows quick and positive release for separation of the removed plates for removal of the molded article. When removing the locked die plates from the injection plate, my device holds the two removed plates together during the breaking of the sprue and then permits separation of the two removed plates.

In the drawing,

Figure 1 is a cross-sectional view of a portion of a die plate containing one portion of the device of my invention.

Figure 2 is a cross-sectional view taken on the line 2—2 of Figure 1 with the die plate removed.

Figure 3 is an elevational view of a portion of another die plate, partly in section, showing another portion of my invention.

Figure 4 is an elevational view, partly in section, of an assembly of die plates provided with the apparatus of my invention and taken along the line 4—4 of Figure 5.

Figure 5 is a front elevational view of the apparatus of Figure 4.

Figure 6 is a cross-sectional view of another embodiment of a portion of my invention.

Specifically, my invention provides a device for locking a first member to a second member, each member having opposite side surfaces, comprising, in combination, an opening of circular cross section extending into said first member from one side surface, the axis of said opening being normal to said one side surface of said first member at the point of entry of said opening into said first member, a resilient annular member fitting the circular wall of said opening, an annular resilient bushing disposed within and operatively fitting said resilient annular member, the inner wall of said bushing containing serrations, a slot extending longitudinally through the wall of said bushing from the end thereof nearest said one side surface of said first member, means retaining said annular member and said bushing from axial movement, a male member extending from one side surface of said second member, said male member being of circular cross section and at least a portion of its surface containing serrations, the serrations of said male member being adapted to fit the serrations of the inner wall of said bushing when said male member is disposed operatively within said bushing.

Referring now to the drawing and specifically to Figure 1, reference numeral 11 identifies the mating portion of my locking mechanism. This mating portion of a locking mechanism comprises a soft rubber ring or cylindrical member 17. This ring 17 is enclosed within an opening of circular cross section 24 in a die plate 27. A resilient bushing 13 is disposed inside of the soft rubber ring 17, as shown. Attached to one end of the bushing 13 is a flange of resilient material 18 which is positioned between the end of the soft rubber ring and metal surface 12. A firm rubber retainer ring 19 is positioned as shown to assist in holding the resilient bushing 13 and the rubber ring 17 in place. Holding the rubber retainer ring 19 in place is a metal retaining ring 21 disposed in a groove 26. An opening or vent 15 is provided at about the position illustrated in Figure 1 for venting of fluid during positioning of die plates 27 and 29 together, and for admitting fluid when the die plates are separated.

Disposed around the inner wall of the resilient bushing 13 are serration crests or ridges 16 alternating with valleys or depressions 16a. These crests or ridges and valleys or depressions are not threads but they are merely truly circular in form. I have provided three longitudinal slots 23 equally spaced around the circumference of the resilient bushing 13. Two slots 23 are seen in Figure 1 while the cross-sectional view of the mating portion of my locking mechanism (Figure 2) shows all three of these slots. The flange 18 and the bushing 13 are a single piece of material, mainly for the purpose of supporting the flange 13 segments.

Upon insertion of male member 31 into the bushing 13, the three separate sections of the resilient bushing 13 are pushed outward with compression of the soft rubber ring 17 during such time as a ridge or crest 33 of the male member is sliding past a ridge or crest 16 of the mating member 11. As soon as a valley or depression 35 of the male member comes in close proximity to the crest or ridge 16 of the mating member, the soft rubber ring 17 expands, forcing the resilient bushing 13 into its normal position in full contact with all exposed surfaces of the male member or plunger 31.

The male member 31 is illustrated in detail in Figure 3 and comprises merely a body member 32 of circular cross section on one end of which is disposed a shoulder or flange 36. On its other end is a neck 34 and adjacent this neck is a plurality of ridges and valleys 33 and 35 respectively. An opening 37 is provided throughout the length of the male member 31 for passage of fluid as required. In Figure 3 the body portion 32 of the male member is illustrated as being retained in die plate 29 by threads 30. Other means are sometimes used for rigidly attaching male members to such a plate as, for example, shoulder 36 is provided as illustrated and at the other surface of die plate 29 a lock ring is countersunk to prevent the inserted member from moving from left to right of Figure 3. Obviously shoulder or flange 36 prevents the member from moving toward the right in Figure 3.

Figures 4 and 5 are intended to illustrate a plurality of holding mechanisms of my invention arranged in multiple die plates in an injection molding apparatus. Die plates 27 and 29 in Figure 4 correspond to the plates 27 and 29 respectively in Figures 1 and 2. A third die plate 25 is a fixed plate or injection plate; that is, it is the plate containing a small opening adjacent the mold cavity 51 into which an injection nozzle 41 fits for injecting the material to be molded. Mold cavity 51 is intended to illustrate a mold used for molding a tumbler. Device 45 is threaded into die plate 29 as illustrated, with its other end being attached directly to a mechanism for exerting a pulling force or a pushing force as required. When the apparatus is being assembled for molding an article, device 45 is pushed from right to left thereby assembling the three die plates in the relative positions illustrated in Figure 4. In case plate 29 is separated from plate 27, upon pushing plate 29 toward plate 27, three of the holding devices of my invention are brought into action and the male members enter the mating portions 11 which are equally spaced in die plate 27. The male members, of course, are similarly spaced in the die plate 29.

When making the rubber ring 17 of relatively soft rubber and the resilient bushing 13 of such material as a polyethylene, nylon, or Teflon (polytetrafluoroethylene) or other suitable material, a force of approximately 200 pounds is required to be exerted by device 45 in order to fully assemble plate 29 with respect to plate 27, that is, to mate three male members into the corresponding female members. After plate 29 is assembled with respect to plate 27, both plates are forced against plate 25 and this force is maintained during the actual injecting or molding portion of the operation. After the article has been molded a pulling force is exerted on device 45 sufficient to break the sprue from the end of the injection nozzle 41 because the three devices of my invention hold plates 27 and 29 together during this sprue breaking operation. After the sprue is broken, plates 27 and 29 are moved further to the right to such an extent that lugs or stops 43 disposed on leader pins 42, as illustrated, catch die plate 27 and prevent this plate from moving further to the right. On continued exertion of pull force on device 45 toward the right the three male members are removed from their corresponding mating members and die plate 29 is thus separated from die plate 27 so that the molded article can be removed.

The separate slot 40 is provided in die plate 29, as illustrated in Figure 5, so that each lug 43 will slide through a slot as die plate 29 is moved from left to right. The lugs 43, of course, contact die plate 27 and prevent it from further movement to the right, thereby allowing die plates 29 and 27 to become separated. A vent 38 is disposed in die plate 25 and communicates with vent 15 in plate 27 for passage of fluid in either direction as required.

I find that, in some instances, a plurality of O-rings makes an excellent substitute in the mating member of my invention for the soft rubber ring 17. I find that such a soft rubber ring as ring 17 is difficult to make outside of a rubber fabricating plant and, for all practical purposes, O-rings of almost any size and ring thickness can be purchased. Figure 6 illustrates the plurality of O-rings 47 which, when positioned adjacent one another, as illustrated in Figure 6, provides the general configuration of the soft rubber ring 17 of Figure 1. When using the O-rings 47, they merely replace the soft rubber ring 17; the resilient bushing with its flange 18 is the same and the rubber retainer ring 19 is the same, this entire assembly being held in place by the same metal ring 21, as hereinbefore mentioned.

By the terms serrated or serrations are meant alternately disposed elevations and depressions. The terms crests, ridges, ribs, are intended to be synonymous with the term elevation, and valleys, depressions, etc., are intended to be synonymous with the term depressed portion. When the apparatus is fully assembled, it is intended that a valley on the mating member 11 be in contact with a crest or ridge on the male member and vice versa. A ridge or crest surface on one of these members is intended to fit or to conform to a valley or crest surface on the other member. The particular cross-sectional form of these valleys and ridges is not critical since the resilient annular member which backs up the bushing is intended to give resiliently so that the male member may be inserted into the bushing; and when the valleys and grooves of the male member and of the bushing are fully mated, the two members are intended to be firmly held together, yet upon exertion of a considerable pulling force one member is withdrawn from the other member.

In one case such an assembly required a pushing force of about 200 pounds to insert three male members in die plate 29 into their corresponding mating members in plate 27, i.e., for surface 22 to be in contact with die plate surface 20, and when separating plate 27 from plate 29, a force of 300 pounds was required to separate these plates. Thus these forces are sufficient to hold the die plates tightly together during the injection portion of the operation and the pulling force is sufficient to break the sprue from the molded article and yet is not so great but that die plates 27 and 29 can be relatively easily separated for the removal of the molded article.

While my invention has been described for use in holding injection mold die plates together, it is useful as door latches, for example, cabinet door latches, screen door latches, refrigerator door latches, and in many other applications for holding one member to another member, and yet providing for separation of the two members. In many applications, as for door latches, the mating members are smaller than those intended for use with injection molding plates. In other applications larger sizes are used.

While certain embodiments of the invention have been described for illustrative purposes, the invention obviously is not limited thereto.

The male member is, in some cases, made of steel, with the serrated portion being very smooth and polished. In other cases, if desired, this member is made of nylon, or firm polyethylene plastic, or any suitably firm material which can be smoothed or polished sufficiently as not to unduly abrade the annular member 13 during operation of the device.

I claim:

1. A releasable snap locking device for locking a first plate to a second plate, each plate having opposite side surfaces, comprising, in combination, said first plate having an opening of circular cross section extending thereinto from one side surface and ending short of the other side surface thereby providing an inner end wall, the axis of said opening being normal to said one side surface of said first plate at the point of entry of said opening into said first plate, a resilient annular member positioned entirely within and fitting the circular wall of said opening, an annular resilient bushing of circular cross section disposed within and operatively fitting said resilient annular member, the inner wall of said bushing being serrated, the serrations being of circular cross sections in planes normal to the axis of said bushing, said bushing having a slot through its wall extending from the end thereof nearest said one side surface toward its other end, an annular resilient flange joined with the end of said bushing nearest said other side surface of said first plate and bearing against said inner end wall, said inner end wall and said flange restraining said bushing and said resilient annular member against axial movement from said one side surface, the inner diameter of said flange corresponding substantially to the inner diameter of said bushing adjacent said flange, means restraining said annular member from axial movement toward said one side surface, a male member extending outward from one side surface of said second plate, said male member being of circular cross section and at least a portion of its surface being serrated, these latter serrations being also of circular cross sections in planes normal to the axis of said male member, the serrations of said male member fitting the serrations of said bushing when said male member is disposed operatively within said bushing.

2. The device of claim 1 wherein said resilient annular member comprises a single resilient annular member.

3. The device of claim 1 wherein said resilient annular member comprises a plurality of resilient rings.

4. A releasable snap locking device for locking a first plate to a second plate, each plate having opposite side surfaces, comprising, in combination, said first plate having an opening of circular cross section extending thereinto from one side surface and ending short of the other side surface thereby providing an inner end wall, the axis of said opening being normal to said one side surface of said first plate at the point of entry of said opening into said first plate, a resilient annular member positioned entirely within and fitting the circular wall of said opening, an annular resilient bushing of circular cross section disposed within and operatively fitting said resilient annular member, the inner wall of said bushing being serrated, the serrations being of circular cross sections in planes normal to the axis of said bushing, said bushing having a trio of circumferentially spaced slots through its wall extending from the end thereof nearest said one side surface toward its other end, an annular resilient flange joined with the end of said bushing nearest said other side surface of said first plate and bearing against said inner end wall, said inner end wall and said flange restraining said bushing and said resilient annular member against axial movement from said one side surface, the inner diameter of said flange corresponding substantially to the inner diameter of said bushing adjacent said flange, a resilient ring in said opening adjacent said bushing and on the end thereof nearest said one side surface, the inner diameter of said ring corresponding substantially to the inner diameter of said bushing adjacent said ring, a groove in the circular wall of said opening, said groove having a greater diameter than the diameter of the remainder of said opening, a retainer ring fitting said groove, said groove and retainer ring being positioned intermediate said resilient ring and said one side surface whereby said retainer ring restrains said resilient ring, said annular member, said bushing and said flange against axial movement toward said one side surface, a male member extending outward from one side surface of said second plate, said male member being of circular cross section and at least a portion of its surface being serrated, these latter serrations being also of circular cross sections in planes normal to the axis of said male member, the serrations of said male member fitting the serrations of said bushing when said male member is disposed operatively within said bushing.

5. The device of claim 4 wherein said resilient annular member comprises a single resilient annular member.

6. The device of claim 4 wherein said resilient annular member comprises a plurality of resilient rings.

References Cited in the file of this patent

UNITED STATES PATENTS

| | | |
|---|---|---|
| 635,211 | Van Wickel | Oct. 17, 1899 |
| 1,856,646 | Lee | May 3, 1932 |
| 2,129,167 | Cunnington | Sept. 6, 1938 |
| 2,132,636 | Maahs | Oct. 11, 1938 |

FOREIGN PATENTS

| | | |
|---|---|---|
| 1,111,742 | France | March 1956 |